United States Patent

Sugita et al.

Patent Number: 5,965,230
Date of Patent: *Oct. 12, 1999

[54] BLANK FOR MAGNETIC HARD DISK AND METHOD FOR PRODUCING SAME

[75] Inventors: Tomoyuki Sugita; Yuichi Hayashi; Keiji Okada; Hideo Fujimoto, all of Moka, Japan

[73] Assignee: Kabushiki Kaisha Kobe Seiko Sho, Kobe, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/784,922

[22] Filed: Jan. 16, 1997

[30] Foreign Application Priority Data

Jan. 22, 1996 [JP] Japan .................................. 8-008752

[51] Int. Cl.$^6$ ........................................................ G11B 5/66
[52] U.S. Cl. ........................ 428/65.3; 428/65.6; 428/141; 428/694 ST; 428/694 SG; 428/900; 427/127; 427/128; 427/129; 427/130; 427/131; 427/307
[58] Field of Search .................................. 428/141, 65.3, 428/65.6, 694 ST, 694 SG, 900; 427/127, 128, 129, 130, 131, 307

[56] References Cited

U.S. PATENT DOCUMENTS

| | | | |
|---|---|---|---|
| 4,925,738 | 5/1990 | Tsuya | 428/472.2 |
| 5,122,423 | 6/1992 | Hose | 428/694 TS |
| 5,470,636 | 11/1995 | Wokui | 428/141 |

*Primary Examiner*—Leszek Kiliman
*Attorney, Agent, or Firm*—Oblon, Spivak, McClelland, Maier & Neustadt, P.C.

[57] ABSTRACT

A blank for magnetic hard disk and a method for producing the same are provided, characterized in that the attachment or adhesion of a blank of a disk shape to each other can be prevented when such blank is stacked together for disk annealing, thereby improving the productivity of magnetic hard disk, and that the damage of blank surface can be prevented during blanking. Firstly, an aluminium alloy plate is subjected to continuous surface washing process with an etching solution while winding off the aluminium alloy plate in a coil, whereby the oxide film on the surface of the aluminium alloy plate is removed to concurrently deposit insoluble smut on the surface. Then, the aluminium alloy plate after the washing process is pressed for blanking thereof into a blank of a disk shape.

14 Claims, 1 Drawing Sheet

BLANK FOR MAGNETIC HARD DISK AND METHOD FOR PRODUCING SAME

BACKGROUND OF THE INVENTION

1. Field of the Invention

The present invention relates to a blank for magnetic hard disk produced by blanking an aluminium- or aluminium alloy plate in the form of a disk, and a method for producing the same. More specifically, the present invention relates to a blank for magnetic hard disk and a method for producing the same, characterized in that even after annealing such blank stacked on each other, the blank can be peeled off from each other.

2. Description of the Related Art

The magnetic hard disk materials to be used as a recording medium for computer systems and the like should be demanded to have the following properties;
1. the materials should be of light weight;
2. the materials should be non-magnetic;
3. the materials should be rigid;
4. the materials can readily procure excellent surface precision by precise processing and grinding; and
5. the materials should be inexpensive.

Therefore, aluminium alloy plates are generally used as magnetic hard disk materials. Aluminium alloy plates of 5,000 series, such as 5086 alloy, in particular, are excellent in terms of the properties described above. Therefore, such aluminium alloy plates are used, in the forms of coating-type media or thin-film media, as aluminium materials for hard disk drive (HDD) as a recording medium for computer systems.

Such aluminium disks are generally produced as follows. Producing firstly an aluminium alloy ingot, the ingot is then subjected to soaking process and hot rolling prior to cold rolling, to prepare an aluminium alloy plate at a given plate thickness. The resulting aluminium alloy plate is blanked into a disk form, which is defined as so-called blank. The blank thus prepared is stacked together for pressure loading so as to remove the distortion and for subsequent annealing while the stacked blanks are kept at a temperature above 300° C. (such annealing is referred to as 'disk annealing' hereinafter). The individual blanks after such disk annealing adhere to each other because the blanks are in contact to each other, at such a high temperature under a high pressure for a long period, which causes Al and Mg atoms in one blank to be transferred into an adjacent blank. Hence, the individual blanks should necessarily be peeled off from each other after annealing.

After the termination of peeling, such individual blanks should be subjected to substrate processing. The term 'substrate processing' means a process of grinding the surface of a blank by means of a grindstone of about #3000. The processing is for the following purposes;

1. finishing a product of a given dimension; and
2. for subsequent plating process and polishing process, removing the oxide film layer on the blank surface and decreasing the surface roughness of the blank prior to plating process. The surface roughness of the blank is about 30 nm after the substrate processing.

By processing the substrate-processed blank with Ni—P plating of a thickness of 20 $\mu$m or less, intensity and hardness can be imparted to the disk to prevent the occurrence of data error because of disk damage. Furthermore, the plating film should be polished so as to remove so-called plating defects developed in the Ni—P plating and to prepare the Ni—P plating film into a smooth film. The process makes a magnetic head at low flotation, to yield highly dense recording.

Following the cost down of computer systems in recent years, the cost down of the substrate processing has been demanded. As the method for decreasing the cost of the substrate processing, a method has been known, comprising preliminarily removing the surface oxide film of an aluminium alloy plate prior to grinding, thereby improving the grinding rate. For aluminium disk production on the basis of the method described above, investigations have been made of a method comprising melting and removing the surface oxide film of a blank with nitric acid or phosphoric acid prior to blanking of an aluminium alloy plate into a disk form and subjecting the resulting blank to substrate processing.

During the process of continuously melting and removing the surface oxide film of an aluminium alloy plate with nitric acid or phosphoric acid while winding off the aluminum alloy plate in a coil, however, the blank should adhere to each other because the blank is in contact, through the clean aluminium surface with no oxide film, to each other which causes the transfer of Al and Mg atoms between such blanks when the blank is stacked together at a high temperature and a high pressure for disk annealing. Hence, the individual blanks adhere to each other more tightly, so a higher peeling strength is required than those by conventional processes, when these blanks are to be peeled off from each other after the completion of disk annealing. Therefore, the individual blanks are peeled off from each other with much more difficulty. Consequently, the productivity of aluminium disk is down, involving potential damage of disk surface during peeling.

During blanking process, additionally, the aluminium alloy plate with the surface hard oxide film preliminarily removed with nitric acid or phosphoric acid is disadvantageously more readily damaged of the surface thereof than aluminium alloy plates with the surface oxide film never removed.

So as to enhance the peelability of a disk after disk annealing, it is effective that an appropriate oxide film is present, as an inclusion for preventing the transfer of Al and Mg atoms, on an aluminium material, and a method therefor is proposed as is found in Japanese Patent Laid-open No. Hei 6-84170. Adversely, however, the presence of such oxide film makes more difficult the grinding process of a blank material into a substrate, involving the decrease of the productivity, disadvantageously. So as to prevent this, a blank after disk annealing and peeling should necessarily be washed with nitric acid or phosphoric acid so as to remove the oxide film prior to surface grinding. Then, washing process should be introduced. Additionally in this case, individual peeled-off blanks should be washed at a minimum unit (one blank at the lower limit) each time. In any way, the productivity will be decreased from the respect of the overall substrate production process, which is not necessarily effective.

In such problematic circumstances, the present invention has been attained. The object of the present invention is to provide a blank for magnetic hard disk and a method for producing the same, characterized in that even after removing the oxide film of the blank so as to improve the grinding rate, the adhesion or attachment of the blank to each other can be prevented during disk annealing, thereby improving the productivity of magnetic hard disk and that the damage of the surface of the blank can be prevented during the blanking process.

SUMMARY OF THE INVENTION

As has been described insofar, according to the conventional method for preparing blanks, wherein the oxide film is generally never removed prior to blanking so as to improve the peelability of blanks after disk annealing and to prevent the damage during blanking process, disk annealing is effected as the film is still attached on the surface, and thereafter, the oxide film is removed by chemical etching to improve the grinding efficiency.

However, the present inventors have made investigations with attention focused on insoluble smut so as to improve blank peelability during disk annealing of an aluminium alloy plate with the surface oxide film removed. The inventors have found that the oxide film can be removed by appropriate washing in a predetermined etching solution prior to blanking, involving the generation of insoluble smut, which presence prevents direct contact of the clean aluminium alloy surfaces of individual blanks with no oxide film thereon, because of the inclusion of the insoluble smut between the stacked blanks during the disk annealing of the blanks at a high temperature and a high pressure, whereby the peelability of the individual blanks after such disk annealing can be improved distinctively and the surface damage of the blanks during blanking can be prevented. Thus, the present invention has been achieved.

Essentially, the blank for magnetic hard disk in accordance with the present invention characteristically has the surface with deposition of insoluble smut generated through chemical etching. Such insoluble smut contains at least one compound of aluminium hydroxide-, magnesium oxide- and aluminium oxide compounds at 80% by weight or more in total. Then, the deposition of the insoluble smut is preferably 0.1 g/m$^2$ or more and less than 3 g/m$^2$.

The method for producing a blank for magnetic hard disk in accordance with the present invention essentially comprises an etching process for depositing insoluble smut on an aluminium- or aluminium alloy plate through chemical etching, and a blanking process of blanking the aluminium- or aluminium alloy plate with insoluble smut deposited into a disk shape to generate a blank. After such processes, the blank is subjected to disk annealing. At the etching process, the oxide film on the surface of the aluminium- or aluminium alloy plate is removed, and concurrently, insoluble smut should be deposited on the surface. As the etching solution with such action, preference is given to an aqueous sodium hydroxide solution. At the etching process, the insoluble smut containing at least one compound of aluminium hydroxide-, magnesium oxide- and aluminium oxide compounds at 80% by weight or more in total is deposited at a deposition of 0.1 g/m$^2$ or more and less than 3 g/m$^2$.

By such method, an aluminium alloy plate with such surface properties is produced prior to blanking process and disk annealing, whereby the direct contact of the clean aluminum alloy surface of stacked blanks to each other can be prevented, through the presence of the insoluble smut between the stacked blanks, during the disk annealing of these blanks at a high temperature and a high pressure, whereby the peelability of the individual blanks is markedly improved after disk annealing. Even without oxide film, the surface damage can be prevented during blanking; additionally, the insoluble smut can readily be removed by surface grinding at substrate processing, which contributes greatly to the improvement of the quality and productivity of blanks.

Still furthermore, by coating a lubricant oil of an evaporation temperature of 300° C. or less and a viscosity of 1 mm$^2$/second or more and less than 50 mm$^2$/second on the surface of the aluminium- or aluminium alloy plate, after the termination of the etching process and prior to the blanking process, the surface damage during blanking can further be prevented.

DETAILED DESCRIPTION OF THE PREFERRED EMBODIMENTS

Figure 1:
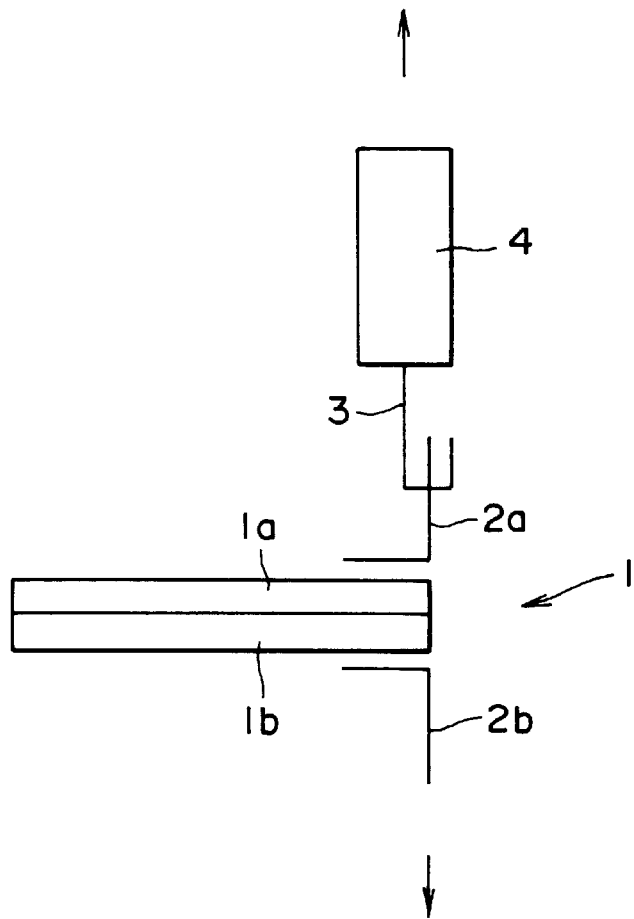
FIG. 1 is a schematic view depicting an apparatus to be used at a blank peeling test.

The present invention will be described in detail hereinafter. At the etching process of the present invention, an aluminium alloy plate is effectively etched by using an aqueous sodium hydroxide solution. Through etching with an aqueous sodium hydroxide solution, the hard oxide film on the surface of the aluminium alloy plate is removed to then generate a thin film of insoluble smut (inclusion) containing at least one of aluminium hydroxide, aluminium oxide and magnesium oxide, in place of the oxide film removed. After etching the aluminium alloy surface using aluminium hydroxide, generally, such insoluble smut should be removed with nitric acid and the like because the insoluble smut may be peeled off from the aluminium alloy surface to potentially contaminate the products and equipment. In accordance with the present invention, however, the presence of such film (inclusion) can prevent the attachment or adhesion of individual blanks during disk annealing to improve the peelability. Unlike the hard oxide film spontaneously formed on an aluminium alloy surface via atmospheric reaction, the oxide thus formed on the surface is fragile with lower adhesion to the aluminium alloy surface of a thickness as large as 300 to 1,000 nm.

As such etching solution, nitric acid and phosphoric acid are known, but these etching solutions do not generate insoluble smut. Therefore, these solutions are not suitable as the etching solution of the present invention.

The present invention will now be described more specifically. For the peelability and the like, effectively, the insoluble smut on the surface of an aluminium alloy plate after etching contains at least one compound of aluminium hydroxide, magnesium oxide and aluminium oxide compounds at 80% by weight or more and is deposited at 0.1 g/m$^2$ or more and less than 3 g/m$^2$. The surface properties of the insoluble smut as described above are maintained mostly on individual peeled-off blanks after disk annealing.

Generally, the insoluble smut level on an aluminium alloy plate has a relation in proportion to the etching level; as the etching level is elevated, the insoluble smut level is more increased. Also, the etching level is higher as the concentration and temperature of the etching solution are higher and the washing time is prolonged. In accordance with the present invention, etching conditions should be selected appropriately, so as to generate the preferable oxide components and deposition level as described above. For example, a temperature of 50° C., a concentration of 10% and a time of 10 seconds are preferable for an aqueous sodium hydroxide solution.

So as to improve the effect of preventing damage on blank surface during blanking, furthermore, a lubricant oil of an evaporation temperature of 300° C. or less and a viscosity of 1 mm$^2$/second or more and less than 50 mm$^2$/second is effectively coated on the surface of the aluminium alloy plate after the termination of the etching process and prior to the blanking process.

The reason why a variety of numerical figures are to be defined under the conditions of producing a blank for magnetic hard disk in accordance with the present invention will now be described below.

Insoluble Smut Component

Insoluble smut component contains at least one compound selected from the group consisting of aluminium hydroxide, magnesium oxide and aluminium oxide at 80% by weight or more to the total weight of the insoluble smut This is because the content of such compounds if below 80% by weight to the total weight of the insoluble smut cannot sufficiently prevent the blank adhesion due to disk annealing, and accordingly, the peelability of individual blanks cannot be improved.

Among the compounds, aluminium hydroxide is generated from aluminium dissolved into an etching solution and subsequently bonded to hydroxide ion therein. Magnesium oxide is generated from the magnesium oxide contained in the surface oxide film of an aluminium alloy plate, which is once dissolved and then deposited again. Additionally, aluminium oxide is generated from the aluminium oxide contained in the surface oxide film of an aluminium alloy plate, which is once dissolved and then deposited again.

Such insoluble smut component can be controlled by means of the components of an etching material, the oxide film level, the etching solution and the etching level; when an aluminium alloy plate containing a higher level of Mg for example is used for etching, the level of magnesium oxide contained in the insoluble smut is increased.

Smut level; 0.1 q/m$^2$ or More and Less Than 3.0 g/m$^2$

If the insoluble smut level is less than 0.1 g/m$^2$, the peel strength of a blank after disk annealing cannot sufficiently be lowered because the insoluble smut level is too low. Because etching is insufficient, also, the oxide film is not satisfactorily removed or the grinding rate cannot be improved. If the insoluble smut level is 3.0 g/m$^2$ or more, alternatively, the insoluble smut of itself causes loading in a grindstone, to adversely affect the grinding rate. Thus, the insoluble smut level should preferably be within the range described above.

Etching Solution; Aqueous Sodium Hydroxide Solution

As an etching solution, an aqueous sodium hydroxide solution is preferably used. Other etching solutions include for example N8 defatted solution or hydrochloric acid, but these etching solutions do not have strength enough to effectively melt the surface of an aluminium alloy plate and remove the oxide film thereon or to effectively generate insoluble smut. Thus, such solutions require a prolonged period of time so as to generate insoluble smut on the surface of an aluminium alloy plate, thereby decreasing the blank productivity.

After the termination of the etching process of an aluminium alloy plate and prior to blank production by blanking the aluminium alloy plate, a lubricant oil satisfying the following requirements is preferably coated on the plate.

Evaporation Temperature of Lubricant Oil; 300° C. or Less

Preferably, a lubricant oil to be decomposed and then evaporated at a temperature below 300° C. is preferably coated on an aluminium alloy plate. When a lubricant oil is preliminarily coated on the surface of an aluminium alloy plate, the damage of the surface of blanks can be prevented generally during the blanking process of the aluminium alloy plate. Unless the lubricant oil is decomposed and evaporated at a subsequent disk annealing process, however, the lubricant oil remains on the blank surface to deteriorate the grinding rate during the grinding process after the annealing. Thus, the evaporation temperature of a lubricant oil is preferably a temperature below the holding temperature (300–400° C.) for disk annealing; and the lubricant oil is preferably decomposed completely and is thereafter evaporated, at a temperature below 300° C.

Viscosity of Lubricant Oil; 1 mm$^2$/Second and More and Less than 50 mm$^2$/Second If a lubricant oil has a viscosity of less than 1 mm$^2$/second, the oil has smaller effect of preventing damage on blank surface; while if such oil has a viscosity above 50 mm$^2$/second, blanks coated with the lubricant oil and then attached closely to each other can hardly be peeled off from each other, which causes poor handling.

The material of an aluminium alloy plate as a raw material of the blank for magnetic hard disk in accordance with the present invention is with no specific limitation, and any such material of an appropriate composition may be satisfactorily used, depending on the properties required for a final product.

The present invention will be described in examples, comparing with comparative examples departing from the claims of the present invention. The term "insoluble smut" is simply referred to as "smut" hereinafter.

First Embodiment

In the present embodiment, an aluminium alloy plate is preliminarily subjected to a variety of pre-treatment processes, prior to blank production.

An aluminium alloy plate (a plate thickness of 0.83 mm) containing 4.5% by weight of Mg was subjected to the pre-treatment processes shown in the following Table 3. In the present embodiment, the aluminium alloy plate was subjected to chemical etching process with an aqueous sodium hydroxide solution or N8 defatted solution (commercially available sodium phosphate-type alkali defatted solution; manufactured by Nippon Paint, Co. Ltd. ). Subsequently, the chemically etched aluminium alloy plate was pressed to blank a plurality of blanks of a ring shape of an outer diameter of 95 mm and an inner diameter of 25 mm. Following the disk annealing conditions and grinding conditions as individually shown in Table 1 and 2 below, the blanks were subjected to annealing and grinding.

Figure 2:
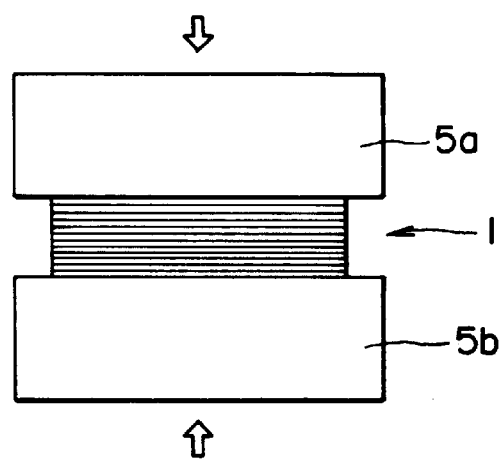
FIG. 2 is a view depicting the method for disk annealing.

FIG. 2 is a view depicting the process of disk annealing. As shown in FIG. 2, the individual blanks were stacked together; and supporting the stacked blank 1 between alumi-spacers 5a, 5b from the upper and lower directions and loading a given pressure shown in Table 1, disk annealing was carried out at a temperature for a time period, as shown in Table 1 below.

TABLE 1

| | Disk annealing conditions |
|---|---|
| Pressure load | 60 kg/cm$^2$ |
| Holding | uniform holding at 350° C. for 3 hours |
| Heating system | Heating in an air oven |

TABLE 2

| | Grinding conditions |
|---|---|
| Grindstone grid | # 3000 |
| Grindstone material | PVA |
| Grinding period | 2 minutes |

Subsequently, the grinding rate of annealed and ground blanks during grinding process as well as the peelability thereof after disk annealing was assessed. The testing method and assessment standards then are shown below.

Grinding Rate Test

Under the conditions shown in Table 2, the blanks were ground by means of a grinding test machine. Subsequently, the blanks were weighed, and the grinding rate thereof was determined on the basis of the amount of the ground material. While defining as 100% the amount of the ground material from the blank of Comparative Example 4 with no pre-treatment, as shown in Table 3 below, the aforementioned rate is shown as a relative ratio. The results are shown in the column of assessment outcome of Table 4 below; the grinding rates of 120% or more, 101% or more and less than 120%, and 100% or less, are ranked as good (○), fair (Δ) and bad (x), respectively.

Peelability Test After Disk Annealing

FIG. 1 is a schematic view depicting an apparatus to be used for blank peeling test. As shown in FIG. 1, blank 1 comprising blank 1a and blank 1b which are attached together by disk annealing is placed between device 2a and device 2b both of an L-type. One end of the device 2a is bonded to the upper end of the blank 1a, while one end of the device 2b is bonded to the lower end of the blank 1b. While connecting the device 2a through connecting device 3 to force gauge 4, a load is applied onto the force gauge 4 and the device 2b along the arrow direction. Then, a load at which the blank 1a is peeled off from the blank 1b is measured by the force gauge 4.

In such manner, the peel strength was measured to evaluate the peelability. In the same manner as for the assessment of the grinding rate test, the results of the evaluation are shown as a relative ratio to the peel strength of the blank of Comparative Example 4 as shown in Table 3, which strength is defined as 100%. The results are shown in the column of the assessment outcome of Table 4 below; the peel strength was ranked as good (○), fair (Δ) and bad (x) when the relative ratio was less than 50%, 50% and more and less than 80%, and 80% or more, respectively.

As shown in Table 4, the grinding rate and peelability were both improved with the decrease of the peel strength, in Examples 1 to 6, because appropriate processing was conducted therein. In Examples 1 to 4, in particular, the components and level of the smut were so appropriate that the grinding rate and peelability were both excellent.

TABLE 3

| | No. | Pre-treatment | Products |
|---|---|---|---|
| Examples | 1 | 20-second etching with aqueous 10% sodium hydroxide solution | aluminium hydroxide; 38 wt % aluminium oxide; 30 wt % magnesium oxide; 30 wt % others ; 2 wt % residue 0.6 g/m$^2$ |
| | 2 | 10-min etching with 5% N8 solution | aluminium hydroxide; 37 wt % aluminium oxide; 32 wt %, magnesium oxide; 29 wt %, others ; 2 wt %, residue 0.5 g/m$^2$ |
| | 3 | 80-second etching with aqueous 10% sodium hydroxide solution | aluminium hydroxide; 46 wt % aluminium oxide; 30 wt %, magnesium oxide; 22 wt %, others ; 2 wt %, residue 2.5 g/m$^2$ |
| | 4 | 3-min etching with 5% N8 solution | aluminium hydroxide; 36 wt % aluminium oxide; 21 wt %, magnesium oxide; 40 wt %, others ; 3 wt %, residue 0.15 g/m$^2$ |
| | 5 | 150-second etching with aqueous 10% sodium hydroxide | aluminium hydroxide; 62 wt % aluminium oxide; 20 wt %, magnesium oxide; 16 wt %, |

TABLE 3-continued

| | No. | Pre-treatment | Products |
|---|---|---|---|
| | | solution | others ; 2 wt %, residue 4.6 g/m$^2$ |
| | 6 | 1-min etching wlth 5% N8 solution | aluminium hydroxide; 37 wt % aluminium oxide; 32 wt %, magnesium oxide; 29 wt %, others ; 2 wt %, residue 0.06 g/m$^2$ |
| Comp. Examples | 1 | coating with water glass resin | sodium silicate film 1.2 g/m$^2$ |
| | 2 | galvanizing | galvanizing layer 0.5 g/m$^2$ |
| | 3 | 45-second etching with 12% nitric acid | no |
| | 4 | No pre-treatment | no |

TABLE 4

| | | Grinding rate | | Peel strength | |
|---|---|---|---|---|---|
| | No. | (%) | assessment outcome | (%) | assessment outcome |
| Examples | 1 | 140 | ○ | 24 | ○ |
| | 2 | 142 | ○ | 28 | ○ |
| | 3 | 128 | ○ | 18 | ○ |
| | 4 | 124 | ○ | 41 | ○ |
| | 5 | 112 | Δ | 11 | ○ |
| | 6 | 108 | Δ | 61 | Δ |
| Comparative Examples | 1 | 95 | x | 92 | x |
| | 2 | 25 | x | 43 | ○ |
| | 3 | 136 | ○ | 225 | x |
| | 4 | 100 | x | 100 | x |

In Example 5 etching was conducted to much extent, involving more smut. Therefore, the smut was loaded in the grid of the grindstone, with the resultant lower grinding rate than those of Examples 1 to 4.

In Example 6 etching level was so low that the oxide film was not completely removed. Therefore, the grinding rate was less improved. Because the smut level was low, additionally, the decrease of the peel strength was smaller than the decrease in other Examples.

In Comparative Example 1, alternatively, the sodium silicate film was attached together so the stacked blanks adhered to each other. Therefore, the peel strength of the blanks could not be decreased. Because the oxide film was not removed therefrom, additionally, the grinding rate could not be improved.

In Comparative Example 2, the plating layer exerted its function to prevent the adhesion of the aluminium alloy plate, so the peel strength was decreased. However, the plating layer disturbed the grinding procedure during grinding, so the grinding rate was far more decreased.

In Comparative Example 3, the oxide film was removed. Thus, the grinding rate was improved, but because the blanks were attached together on the clean aluminium face, the peel strength was increased. Comparative Example 4 is one of conventional examples, wherein no pre-treatment was conducted.

Second Embodiment

In the present embodiment, description will be made of smut generation on an aluminium alloy plate by using a variety of solutions for such treatment.

As in the first embodiment, an aluminium alloy plate (a plate thickness of 0.83 mm) containing 4.5% by weight of Mg was subjected to chemical etching by using solutions therefor as shown in the following Table 5. Subsequently, the etched aluminium alloy plate was pressed to blank a plurality of blanks of a ring shape with an outer diameter of 95 mm and an inner diameter of 25 mm. As in the first embodiment, then, following the disk annealing and grinding conditions as individually shown in Table 1 and 2 above, the blanks were subjected to annealing and grinding.

Then, assessments of the following properties were made;
1. time required for depositing a given amount of smut;
2. grinding rate during grinding process; and
3. peelability after disk annealing. In comparative examples, assessments of the following conditions were made;
1. cases with less smut or more smut;
2. smut deposition by etching with N8 defatted solution or hydrochloric acid;
3. etching with aqueous sodium hydroxide solution and thereafter removal of smut with nitric acid; and
4. etching with nitric acid or phosphoric acid, with no generation of smut.

The testing methods and assessment standards in the present embodiment are shown below. Under identical conditions, three aluminium alloy plates were processed, and the average was used for this assessment.

Processing Time

The time required to deposit a given amount of smut on the surface of an aluminium alloy plate was measured. The processing time less than 60 seconds was assessed as acceptable (○), while the processing time above 61 seconds was assessed as not-acceptable (x), as shown in Table 6 below. The processing time in Comparative Example 11 is the total of the processing time with sodium hydroxide and the time with nitric acid.

Grinding Rate Test

Under the conditions shown in Table 2, the blanks were ground as for the grinding rate in the first embodiment. Subsequently, the blanks were weighed, and the grinding rate thereof was determined on the basis of the amount of the ground material. Defining as 100% the amount of the ground material from the blank of Comparative Example 14 with no treatment, as shown in Table 5 below, the rate determined is shown as a relative ratio. The results are shown in the column of assessment outcome of Table 6 below; the grinding rates of 120% or more and less than 120% are ranked as good (○), and bad (x), respectively.

Peelability Test After Disk Annealing

By using an apparatus shown in FIG. 1 as in the first embodiment, the peel strength was measured to evaluate the peelability. The results of the evaluation are shown as a relative ratio to the peel strength of the blank of Comparative Example 14 with no processing as shown in Table 6, which strength is defined as 100%. The results are shown in the column of the assessment outcome of Table 6 below; the peel strength was ranked as good (○) and bad (x) when the relative ratio was less than 50%, and 50% or more, respectively.

TABLE 5

|  | NO. | Solutions for treatment | Residue produced (g/m$^2$) |
|---|---|---|---|
| Ex- | 7 | sodium hydroxide (10%, 50° C.) | 0.2 |
| amples | 8 | sodium hydroxide (10%, 50° C.) | 0.6 |
|  | 9 | sodium hydroxide (10%, 70° C.) | 1.0 |
|  | 10 | sodium hydroxide (10%, 70° C.) | 2.5 |
| Comp. | 5 | sodium hydroxide (10%, 50° C.) | 0.06 |
| Ex- | 6 | sodium hydroxide (10%, 70° C.) | 4.8 |
| amples | 7 | N8 defatted solution (5%, 70° C.) | 0.06 |

TABLE 5-continued

| NO. | Solutions for treatment | Residue produced (g/m$^2$) |
|---|---|---|
| 8 | N8 defatted solution (5%, 70° C.) | 0.2 |
| 9 | hydrochloric acid (30%, 50° C.) | 0.02 |
| 10 | hydrochlorlc acid (30%, 50° C.) | 0.2 |
| 11 | sodium hydroxide (10%, 50° C., 10 sec.) →nitric acid (10%, 25° C., 30 sec.) | 0 |
| 12 | nitric acid (10%, 25° C., 30 sec.) | 0 |
| 13 | phosphoric acid (10%, 25° C., 30 sec.) | 0 |
| 14 | no treatment | 0 |

TABLE 6

|  |  | Processing time | | Grinding rate | | Peel strength | |
|---|---|---|---|---|---|---|---|
|  |  | (%) | assessment outcome | (%) | assessment outcome | (%) | assessment outcome |
| Ex- | 7 | 6 | ○ | 128 | ○ | 35 | ○ |
| amples | 8 | 20 | ○ | 140 | ○ | 20 | ○ |
|  | 9 | 10 | ○ | 142 | ○ | 21 | ○ |
|  | 10 | 25 | ○ | 128 | ○ | 18 | ○ |
| Comp. | 5 | 2 | ○ | 108 | x | 61 | x |
| Ex- | 6 | 50 | ○ | 112 | x | 8 | ○ |
| amples | 7 | 60 | ○ | 108 | x | 61 | x |

TABLE 6

|  | Processing time | | Grinding rate | | Peel strength | |
|---|---|---|---|---|---|---|
|  | (%) | assessment outcome | (%) | assessment outcome | (%) | assessment outcome |
| 8 | 180 | x | 125 | ○ | 34 | ○ |
| 9 | 60 | ○ | 104 | x | 88 | x |
| 10 | 600 | x | 122 | ○ | 31 | ○ |
| 11 | 40 | ○ | 162 | ○ | 220 | x |
| 12 | 30 | ○ | 146 | ○ | 297 | x |
| 13 | 30 | ○ | 178 | ○ | 357 | x |
| 14 | 0 | ○ | 100 | x | 100 | x |

As shown in Table 6, in Examples 7 to 10, appropriate amounts of surface smut were generated in a short period of time; and the processing time, grinding rate and peel strength were all excellent.

In Comparative Example 5, alternatively, the etching with the aqueous sodium hydroxide solution was so incomplete that the oxide film could not be removed thoroughly, involving no improvement of the grinding rate. Because smut was not generated thoroughly, the decrease of the peel strength was less.

In Comparative Example 6, the duration of etching was so long that too much smut was deposited so that the smut of itself caused the loading of the grindstone, involving insufficient improvement of the grinding rate.

In Comparative Examples 7 and 9, because the etching with the defatted solution did not exert satisfactory effect, the etching was therefore carried out only incompletely. Thus, the oxide film could not be removed absolutely. Thus, the grinding rate was not improved. Because smut was not generated completely, the decrease of the peel strength was low.

In Comparative Examples 8 and 10, N8 defatted solution and hydrochloric acid were used individually as the etching solutions. In these cases, consequently, the grinding rate and the peelability were both excellent, but a longer time was required to deposit a given amount of smut because the etching solution, N8 defatted solution or hydrochloric acid, had such poor strength in smut generation, involving the decrease of the productivity.

In Comparative Example 11, processing with an aqueous sodium hydroxide solution and subsequent neutralization with nitric acid could not neutralize or solubilize the smut generated on the surface. Thus, the blanks were attached together on the clean aluminium face, causing the increase of the peel strength and difficulty in peeling off these blanks from each other.

In Comparative Examples 12 and 13, the oxide film could be removed. Therefore, the grinding rate was improved. However, smut was not generated on the blank surface. Hence, the blanks were attached together on the clean aluminium face, causing the increase of the peel strength and difficulty in peeling off these blanks from each other. Additionally, Comparative Example 14 is one of conventional examples with no pre-treatment.

Third Embodiment

In the present embodiment, description will be made of blank production from an aluminium alloy plate.

As in the first embodiment described above, an aluminium alloy plate (a plate thickness of 0.83 mm) containing 4.5% by weight of Mg was subjected to processes as shown in Table 7 hereinbelow, to assess the following items;
1. grinding rate during grinding;
2. peelability after disk annealing; and
3. productivity.

The assessment methods of grinding rate and peelability were the same as in the second embodiment described above.

Productivity was assessed as to whether or not etching process (washing process) of an aluminium alloy plate was carried out prior to blanking, namely the possibility of surface washing process of an aluminium alloy plate in a form of coil Productivity was ranked as good (o) when surface washing process thereof in a coil form was possible; and productivity was ranked as poor (x) when the process was impossible so each blank should be washed one by one, as shown in Table 8 below.

As shown in Table 8 above, in Example 11, the coil of an aluminium alloy plate was wound off while continuously

TABLE 7

| | No | Processes |
|---|---|---|
| Examples | 11 | plate →washing with sodium hydroxide (10%, 50° C., 10 seconds) →blanklng →disk annealing →grinding |
| Comp. Examples | 15 | plate →blanklng →disk annealing →washing with sodium hydroxlde (10%, 50° C., 10 seconds) → grinding |
| | 16 | plate →blanking →washing with sodium hydroxide (10%, 50° C., 10 seconds) →disk annealing → grinding |
| | 17 | plate →washing with nitric acid (10%, 25° C., 30 seconds) →blanking →disk annealing →grinding |
| | 18 | plate →blanking →disk annealing →washing with nitric acid (10%, 25° C., 30 seconds) →grinding |
| | 19 | plate →blanking →washing wlth nitric acid (10%, 25° C., 30 seconds) →disk annealing →grinding |
| | 20 | plate →blanking →disk annealing →grinding |

TABLE 8

| | | Grinding rate | | Peel strength | | Productivity | |
|---|---|---|---|---|---|---|---|
| | | (%) | assessment outcome | (%) | assessment outcome | possibility of coil processing | assessment outcome |
| Example | 11 | 140 | ○ | 24 | ○ | coil processable | ○ |
| Comp. Examples | 15 | 145 | ○ | 100 | x | coil never processable | x |
| | 16 | 140 | ○ | 24 | ○ | coil never processable | x |
| | 17 | 146 | ○ | 197 | x | coil processable | ○ |
| | 18 | 152 | ○ | 100 | x | coil never processable | x |
| | 19 | 146 | ○ | 197 | x | coil never processable | x |
| | 20 | 100 | x | 100 | x | — | — | promoting the surface washing process thereof with an aqueous sodium hydroxide solution, prior to blanking. Thus, the grinding rate and peelability were improved with no decrease of the productivity.

In Comparative Example 15, alternatively, blanks after disk annealing were washed with an aqueous sodium hydroxide solution. Thus, the grinding rate was surely improved, but the blanks had similar surface, at the time of annealing, as those of non-processed materials with no smut. Hence, the peelability was not improved. Because washing was effected after blanking, further, the productivity was not improved.

In Comparative Example 16, blanks were washed with an aqueous sodium hydroxide solution, after blanking and prior to disk annealing. Therefore, the grinding rate and peelability were improved, but the aluminium alloy plate in a coil form could not be washed, with no improvement of the productivity.

In Comparative Example 17, an aluminium alloy plate in a coil form was washed. Thus, the grinding rate and productivity were improved. Because the surface was washed with nitric acid, however, the blank surface turned so clean that the blanks stacked together were attached to each other, involving the elevation of the peel strength.

In Comparative Example 18, blanks were surface washed with nitric acid after disk annealing. Thus, the grinding rate was improved, but the peelability was not improved because the blank surface at the time of disk annealing was similar to the surface of a non-treated material with no smut. Thus, the peelability was not improved. Because the aluminium alloy plate in a coil form could not be washed, furthermore, the productivity was not improved.

In Comparative Example 19, blanks were washed, after blanking and prior to disk annealing. Thus, the grinding rate was improved, but no smut was generated because washing was carried out with nitric acid, involving no improvement of the peelability. Additionally, the productivity was not improved. Herein, Comparative Example 20 is one of conventional examples with no surface washing process.

Fourth Embodiment

In the present embodiment, description will be made of coating a lubricant oil onto an aluminium alloy plate prior to blanking.

An aluminium alloy plate processed as in Example 8 of the second embodiment, namely an aluminium alloy plate (a plate thickness of 0.83 mm) containing 4.5% by weight of Mg, was washed with an aqueous 10% sodium hydroxide solution at a temperature of 50° C., to prepare an aluminium alloy plate with 0.6 g/m² smut generated thereon, followed by coating with lubricant oils shown in Table 9 below.

All of the lubricant oils were coated at 2 g/m² by means of a roll coater. Individual aluminium alloy plates coated with the lubricant oils were pressed, prior to blanking of 100 rings blanks of a 95-mm outer diameter and a 25-mm inner diameter from each such plate. The damage on the blank surfaces then observed visually, and thereafter, the blanks were subjected to disk annealing and grinding.

TABLE 9

|  | No. | Lubricant oil | Viscosity (mm²/sec.) | Distillation degree (%) at 300° C. for 3 hours |
|---|---|---|---|---|
| Examples | 12 | polybutene | 20 | 100 |
|  | 13 | mineral oil | 3 | 100 |
| Comparative Examples | 21 | commercially available press oil | 32 | 60 |
|  | 22 | highly viscous synthetic oil | 60 | 100 |
|  | 23 | Fusel oil | 0.7 | 100 |
|  | 24 | none | — | — |

The blanks coated with the lubricant oils shown in Table 9 were assessed as the following items;
1. damage due to blanking on blank surface;
2. grinding rate; and
3. handleability.
Damage due to blanking was ranked as acceptable (○) when the number of damaged blanks was at a ratio of 2% or less; and the damage was ranked as not-acceptable (x) when the number was at a ratio above 2%, as shown in Table 10. The determination and assessment methods of grinding rate were the same as in the first embodiment described above. Furthermore, handleability was ranked as good (○) when blanks coated with a lubricant oil attached together could be peeled off from each other by hands; handleability was ranked as poor (x) when such blanks could not readily be peeled off from each other by hands, as shown in Table 10.

TABLE 10

|  |  | Frequency of surface damage | | Grinding rate | | |
|---|---|---|---|---|---|---|
|  |  | (%) | assessment outcome | (%) | assessment outcome | Handl-ability |
| Ex-ample | 12 | 0 | ○ | 140 | ○ | ○ |
|  | 13 | 1 | ○ | 142 | ○ | ○ |
| Comp. Ex-amples | 21 | 1 | ○ | 112 | x | ○ |
|  | 22 | 0 | ○ | 142 | ○ | x |
|  | 23 | 4 | x | 144 | ○ | ○ |
|  | 24 | 5 | x | 140 | ○ | ○ |

As shown in Table 10, in Examples 12 and 13, the coated lubricants oils of appropriate degrees of viscosity were completely decomposed and evaporated at the time of annealing wherein the alloy plates were retained at a temperature of 300° C. for 3 hours. Thus, the grinding rate and handleability were excellent; and the occurrence of damage on blank surface could be prevented absolutely during blanking.

In Comparative Example 21, alternatively, the coated lubricant oil could not be completely decomposed or evaporated even after disk annealing of the blank at a temperature of 300° C. for 3 hours. Thus, the lubricant oil remained on the blank surface even after annealing, so the grinding rate was decreased at a subsequent grinding process.

In Comparative Example 22, because the coated lubricant oil had a too high viscosity, the blanks were so tightly attached together that the blanks could not be peeled off from each other, involving poor handleability.

In Comparative Example 23, the coated lubricant oil had a too low viscosity, so that the damage occurring on blank surface could not sufficiently be prevented.

In Comparative Example 24, no lubricant oil was coated. Thus, damage occurred during blanking.

In accordance with the present invention, as has been described insofar, an aluminium alloy plate is chemically etched to deposit smut on the surface thereof and concurrently remove the oxide film on the surface, prior to pressing and blanking thereof. Therefore, the attachment or adhesion of individual blanks due to disk annealing can be prevented. Even after disk annealing, the stacked blanks are readily peeled off from each other, thereby improving further the grinding rate of blanks. Consequently, the grinding time required for substrate processing can be shortened, thereby improving the productivity of magnetic hard disk.

By coating an aluminium alloy plate with a given lubricant oil prior to blanking of the alloy plate, the occurrence of damage on the resulting blanks can be prevented during blanking process, whereby a high-quality blank can be produced.

Thus, the present invention makes remarkable contribution to the production of a high-quality magnetic hard disk at a higher productivity.

What is claimed is:

1. An aluminum or aluminum based alloy blank for a magnetic hard disk with insoluble smut generated from chemical etching being deposited on a surface thereof, an aluminum oxide film having been substantially removed by chemical etching from said surface, and said smut generated from chemical etching being deposited on said surface from which an aluminum oxide film has been substantially removed, said blank having improved peelability as compared to when an aluminum oxide film is not removed.

2. A blank for magnetic hard disk, according to claim 1, wherein the insoluble smut contains at least one compound selected from the group consisting of compounds of aluminium hydroxide, magnesium oxide and aluminium oxide, at 80% by weight or more in total.

3. A blank for magnetic hard disk, according to claim 1, wherein the insoluble smut deposited on the surface is 0.1 g/m² or more to 3 g/m².

4. A blank for magnetic hard disk, according to claim 2, wherein the insoluble smut deposited on the surface is 0.1 g/m² or more to 3 g/m².

5. A method comprising producing a blank for magnetic hard disk according to claim 1, and forming the aluminium- or aluminium alloy blank with insoluble smut deposited thereon into a disk shape.

6. A method for producing a blank for magnetic hard disk, according to claim 5, wherein the oxide film is removed from the surface of the aluminium- or aluminium alloy plate and insoluble smut is deposited on the surface by the etching process.

7. A method for producing a blank for magnetic hard disk, according to claim 5, further comprising disk annealing after the completion of the blanking process.

8. A method for producing a blank for magnetic hard disk, according to claim 6, further comprising disk annealing after the completion of the blanking process.

9. A method for producing a blank for magnetic hard disk, according to claim 5, wherein the etching solution is an aqueous sodium hydroxide solution.

10. A method for producing a blank for magnetic hard disk, according to claim 6, wherein the etching solution is an aqueous sodium hydroxide solution.

11. A method for producing a blank for magnetic hard disk, according to claim 7, wherein the etching solution is an aqueous sodium hydroxide solution.

12. A method for producing a blank for magnetic hard disk, according to claim 8, wherein the etching solution is an aqueous sodium hydroxide solution.

13. A method for producing a blank for magnetic hard disk, according to any one of claims 5 to 12, wherein the insoluble smut is deposited at 1 g/m$^2$ and more and less than 3 g/m$^2$ on the surface of the aluminium- or aluminium alloy plate, prior to the blanking process.

14. A method for producing a blank for magnetic hard disk, according to any one of claims 5 to 12, wherein a lubricant oil of a viscosity of 1 mm$^2$/second or more and less than 50 mm$^2$/second and an evaporation temperature of 300° C. or less is coated onto the surface of the aluminium- or aluminium alloy plate, after the termination of the etching process and prior to the blanking process.

* * * * *